US00RE34912E

United States Patent [19]

Sonobe et al.

[11] E Patent Number: Re. 34,912

[45] Reissued Date of Patent: Apr. 18, 1995

[54] SLAG TREATMENT MATERIAL

[75] Inventors: Kozo Sonobe; Takashi Fukuzawa; Kohsuke Takeuchi; Tatushi Tabata; Hiroshi Fukuoka; Kunio Hisamatsu; Makoto Katamura, all of Koriyama, Japan

[73] Assignee: Nippon Chemical Industrial Co., Ltd., Tokyo, Japan

[21] Appl. No.: 124,802

[22] Filed: Sep. 21, 1993

Related U.S. Patent Documents

Reissue of:

[64] Patent No.: 5,187,126
Issued: Feb. 16, 1993
Appl. No.: 616,643
Filed: Nov. 20, 1990

U.S. Applications:

[63] Continuation-in-part of Ser. No. 226,278, Jul. 29, 1988, abandoned.

[30] Foreign Application Priority Data

| | | | |
|---|---|---|---|
| Aug. 4, 1987 | [JP] | Japan | 62-193711 |
| Aug. 4, 1987 | [JP] | Japan | 62-193712 |
| Aug. 4, 1987 | [JP] | Japan | 62-193713 |
| Aug. 4, 1987 | [JP] | Japan | 62-193714 |
| Aug. 4, 1987 | [JP] | Japan | 62-193716 |
| Aug. 4, 1987 | [JP] | Japan | 62-193717 |
| Aug. 4, 1987 | [JP] | Japan | 62-193718 |

[51] Int. Cl.[6] ..... C03C 3/089

[52] U.S. Cl. ..... 501/65; 501/72; 501/77

[58] Field of Search ..... 501/49, 65, 72, 77; 75/564, 565, 563, 562; 65/19, 20

[56] References Cited

U.S. PATENT DOCUMENTS

| | | | |
|---|---|---|---|
| 2,352,425 | 6/1944 | Deyrup | 501/77 |
| 3,440,172 | 4/1969 | Albinak | 252/301.6 |
| 4,655,831 | 4/1987 | Ishizaka et al. | 75/257 |
| 4,882,303 | 11/1989 | Sonobe et al. | 501/28 |

*Primary Examiner*—Karl Group
*Attorney, Agent, or Firm*—Tilton, Fallon, Lungmus & Chestnut

[57] ABSTRACT

A method for improving the characteristics of fused slag material is disclosed. This improved method results in a fused slag having resistance against pulverization at the cooling process for generation of yellowish turbid water due to contact of slag lumps with rain water, this method characterized by forming a slag treatment material by rough crushing a substantially dehydrated heat-treated material containing boron, and adding that slag treatment material to molten slag.

1 Claim, No Drawings

SLAG TREATMENT MATERIAL

Matter enclosed in heavy brackets [ ] appears in the original patent but forms no part of this reissue specification; matter printed in italics indicates the additions made by reissue.

This is a continuation in part of application Ser. No. 226,278, filed Jul. 29, 1988 now abandoned.

BACKGROUND OF THE INVENTION

1. Industrial Field of the Invention

This invention relates to a slag treatment material for modifying the properties of iron slag and steel slag, and, more particularly, to an improved slag treatment material which can effectively act to prevent, when a cooling process is applied to such iron slag or steel slag as blast furnace slag, the powdering of the slag due to disintegration of the generation of yellowish turbid water when slag lumps come into contact with water.

2. Prior Art

A steel slag, particularly stainless steel slag, which has a basicity (weight ratio $CaO/SiO_2$) of substantially 1.5 or more, has a property whereby the $2CaO.SiO_2$, phase changes from an $\alpha$-type phase to an $\alpha'$-type phase, and then changes to a $\gamma$-type phase or $\beta$-type phase when the slag is subjected to a cooling process. In many cases, when the slag changes from the $\alpha'$-type phase to the $\gamma$-type phase, a volume expansion of substantially 14% results. As it well known, this causes the slag to powder into fine particles.

This powdering phenomenon worsens the working environment, and disturbs further utilization of slag. Present stainless steel manufacturers are therefore faced with serious problems in regard to the treatment of slag.

It has long been a problem for stainless steel manufacturers to find a method of preventing the powdering of slag and of solidifying it since the discharged slag can be effectively utilized as a secondary material in such applications as engineering aggregates for road construction and so on.

Known methods of preventing the powdering of slag can be exemplified as follows:

(1) a method in which slab is made into water-granulated glass when the residue slag is discharged;

(2) a method in which slag is modified to form a material which mainly comprises ($CaO.SiO_2$ and has a basicity of 1.5 or less (in practice this can be slightly varied according to the composition of the slag);

(3) a method in which the phase change from an $\alpha$-type phase to a $\gamma$-type which results in a great change in density is controlled and the phase change from an $\alpha'$-type to a $\gamma$-type which results in a great change However, in regard to (1), at the time of water granulation, a phreatic explosion can occur due to the presence of molten metals carried at the time of discharge of the slag, and since water granulated glass is a soft material, it does not have sufficient strength to serve as an engineering aggregate. Therefore, this method (1) has not yet been put into practical use although it has been partially tested.

In regard to (2), although some additives designed to modify the properties of the $SiO_2$ containing material have already been placed on the market, they require the installation of supplying facilities and stirring facilities since a large quantity of $SiO_2$ needs to be employed equivalent to substantially 20% of the molten slag. Furthermore, the slag viscosity is increased according to the drop in temperature of the molten slag following the addition, and this is not suitable from the viewpoint of workability and total cost.

The method (3), that is, bringing about a phase change from an $\alpha'$-type phase to a $\beta$-type phase has been studied for many years and a variety of methods have been disclosed. One of these methods, which is the most effective and assured method available at present. [see Japanese Patent Laid-Open No. 43690/1978 and the Kawatetsu Engineering Report Vol. 18, No. 1 (1986) 20 to 24] is one in which $Si^{4+}$ ions are replaced by $B_{3+}$ ions having a smaller diameter than that of the $Si^{4+}$ ions contained in the slag.

However, the above-described conventional boron type of slag powdering preventing material is in the form of fine powder and a dehydration/vaporization reaction occurs at the time of contact with the molten slag since the boronic slag powdering preventing material is one containing water. As a result of this, a blowing phenomenon of the slag powdering preventing material is generated, causing the working environment to become excessively worsened and sometimes dangerous. Therefore operation of the work is very difficult.

Furthermore, since the conventional boron type of slag powdering preventing material differs significantly in the chemical composition and properties from slag, differences in viscosity and density from the fused slag can be easily generated, that is, the so-called affinity between the slag and the slag powdering preventing material is not sufficient and thereby the diffusing/mixing performance is insufficient. As a result of such disadvantages, the boron type of slag powdering preventing material cannot be put into practical use although there have been some proposals therefor.

A second problem arises in such iron or steel slag as blast furnace slag in that so-called "yellowish turbid water" is generated when the slag comes into contact with water such as rain or gutter water.

As is well known, blast furnace slag is widely used as various aggregates, particularly as road beds. However, it has been confirmed that if the percentage of sulfur contained in the slag is high, a mistake in the conditions or methods for use will cause yellowish turbid water and hydrogen sulfide smells to be generated due to rain water or gutter water which has been brought into contact with the slag. Particularly in order to ensure that the slag quality for road construction is free from such problems, it is a rule that such slag should not generate any yellowish turbid water or hydrogen sulfide smells. In order to evaluate this fact, a color identification test is employed, and slag should satisfy this test (JIS A 5015 made public on Nov. 1).

The phenomenon of generation of yellowish turbid water is caused from the elution of sulfur (S) contained in the form of calcium sulfide (CaS) which is contained, as a major part, in slag, and is due to generation of yellow polysulfide (such as CaSx) after being applied to a hydrolysis process. Known methods of preventing generation of yellowish turbid water can be exemplified as follows:

(1) a method where slag is subjected to aging in which it is oxidized by water and air until it is stabilized;

(2) a method in which an oxidant is added to molten slag;

(3) a method in which slag is treated with $CO_2$ so that the surface of the slag is stabilized; and (4) a method in which the cooling speed of slag is raised.

In regard to (1), aging treatment takes almost one to three months to be completed, requiring the use of a very broad space (slag yard) for storage.

In regard to (2), several methods can be exemplified such as a method in which a high degree of ferrous oxide is added or a method in which a gas containing oxygen, such as air, is added. However, this method is not preferable since poisonous $SO_2$ gas is generated due to the reaction. Furthermore, with this method, the generation of the yellowish turbid water cannot be sufficiently prevented.

In regard to (3), although the surface of slag can be stabilized, when it is used as ballast this method is disadvantageous in that fused sulfides can again overflow from the fractured surface when it is crushed.

The method (4) is a method in which glass is prepared by degrading, diffusing and rapidly cooling down fused slag so that the included sulfur component is prevented from oozing out. However, this involves such problems as a deterioration in strength and necessitates granulation to below a specific viscosity to form the glass, allowing it to be used as a material for thin aggregates, but making it very difficult to be used as rough aggregates.

Although other methods have been disclosed in which iron, manganese or zinc is, as an effective component, added so that sulfides are fixed, these methods have not been put into practical use due to high costs and insufficient effects.

Therefore, at present, the method (1) in which slag is subjected to aging is the only available method for preventing generation of yellowish turbid water from slag.

Problems to be Solved by the Invention

As can be clearly seen from the above description, this invention is intended to overcome the long time problems of powdering and generation of yellowish turbid water from iron and steel slag by means of an industrially low-cost and convenient slag treatment material.

Therefore, an object of the present invention is collectively to overcome the problems by improving the conventional boron type of powdering prevention material so that the reaction in which $Si^{4+}$ is replaced by $B^{3+}$ is further effectively accelerated for the purpose of modifying the properties of slag.

SUMMARY OF THE INVENTION

The inventors of the present invention therefore have investigated improving boron type of slag powdering prevention materials to complete the present invention.

That is, this invention relates to a slag treatment material which modifies properties of iron slag that has resistance against slag powdering during the process of cooling molten slag and against generation of yellowish turbid water when slag is brought into contact with rain water. The treatment material for improving the properties of iron slab is characterized in that it comprises a material obtained by coarsely crushing a substantially dehydrated heat-treated material containing boron.

DETAILED DESCRIPTION OF THE INVENTION

Operation

The operation of the present invention will now be described.

The characteristics of the slag treatment material according to the present invention, different from conventionally known crystal hydrated borate powders used to prevent powdering in steel and iron slag, lie in that it comprises a material which is obtained by coarsely crushing a substantially dehydrated heat-treated material (hereinafter referred to as "heat-treated material containing boron"). The affinity of the heat-treated material containing boron of the present invention to molten slag mainly composed of basic calcium silicate (simply termed "slag" hereinafter) occurring in steel or iron making or the like, is superior to a material containing crystal hydrated borate, the precursor of the former. The result in uniformity with slag favorably surpassed the expectations of the inventors of the present invention.

In this case, the heat-treated material containing boron preferably contains a relatively high percentage of boron, it being contained, in many cases, at about 10 wt % or more $B_2O_3$m preferably about 20 wt % or more.

As a material of the type described above, the following material which has been heat treated can be exemplified:

materials mainly containing two-component type borates such as natural or synthetic alkali borate, alkaline earth metal borate, borosilicate;

materials mainly containing three-component type borosilicates such as alkali borosilicate, alkaline earth metal borosilicate;

materials mainly containing alumino-borosilicates; or materials mainly containing the four components of boron, silicone, an alkali metal and an alkaline earth metal.

Heat-treated material containing boron refers to material containing at least 80 wt % of the above-described main component, in which case the above-described main component contains at least 10 wt % as $B_2O_3$, or preferably 20 wt % as the effective component.

Therefore, remaining components may comprise at most 20 wt %, such components being exemplified by materials unavoidably involved in mixing during the preparation of the heat-treated material, materials for adjusting properties such as melting points, softening points, viscosities, surface tensions, or materials which can be fixed as sulfides.

Such components can be exemplified by $Na_2O$, $K_2O$, $Li_2O$, CaO, MgO, BaO, $SiO_2$, $Fe_2O_3$, $Al_2O_3$, $MnO_2$, ZnO, $P_2O_5$, $CaF_2$ or materials containing these components.

In the above-described materials those containing alkali metal borates as the major component, are from a practical view point preferably represented by the following general formula: $Me_2O.nB_2O_3$ (wherein Me represents one or two or more types of alkali metal elements selected from Li, K and Na, and n represents the range of the number of moles between 1 and 10). Those containing alkaline earth metal borates as the major component are preferably represented by the following formula: $MeO.nB_2O_3$ (wherein Me represents one or two or more alkaline earth metal elements, n represents the range of the number of moles between 1 and 5). Those containing borosilicates are preferably represented by the following general formula: $SiO_2.nB_2O_3$ (wherein n represents the number of moles between 1 and 9). Those containing borosilicates are preferably in the range where $B_2O_3$: 10 to 80 wt %, $SiO_2$: 5 to 70 wt %, $Me_2O$:2 to 50 wt % (however, $B_2O_3+SiO_2+Me_2O \geqq 80$ wt %) and the others: 0 to 20 wt %. Those containing alkaline earth metal borosilicates are preferably in the range where $B_2O_3$:20 to 80 wt %, SiO: 10 to 60 wt %, $Me_2O$:5 to 40 wt % (however $B_2O_3+SiO_2+Me_2O \geqq 80$ wt. %) and the others: 0 to 20 wt %. Those containing alumino-borosilicates are preferably in the range where $B_2O$:20 to 60 wt %, $SiO_2$:5 to 50 wt %, $Al_2O_3$:2 to 20 wt %, $Me_2O$:5 to 50 wt % (wherein Me represents an alkali metal or alkaline earth metal, and n represents the valence), (however $B_2O_3+SiO_2+Al_2O_3+Me_{2/n}O \geqq 80$ wt %) and the others: 0 to 20 wt %. Those containing a material containing boron as the major component of the four component type preferably are in the range where $B_2O_3$:20 to 60 wt %, $Si_2$:10 to 50 wt %, $Me_2O$:3 to 20 wt %, and MeO: 5 to 35 wt %.

The reason for the above lies in that all of the above-described materials containing boron can be easily melted and diffused at the temperature of the molten slag since then the melting points and softening points are in the range of about 1100° C. or less, preferably in the range of 700° to 1050° C. so that the need for the heat treated material containing boron to be quickly melted and diffused in the molten slag can be satisfied due to its composition.

Heat-treated material containing boron here refers to a substantially dehydrated heat treated material which is obtained by sintering or vitrifying a material containing a boron component as the major component. Therefore, sintered materials, glass materials and their mixtures can be included in the heat-treated material containing boron and glass materials are particularly preferable for use in the present invention. Vitrification here refers to materials made amorphous to a degree where they cannot be clearly defined with a specific strength of analyzing rays when X-ray analysis is conducted.

The heat-treated material containing boron according to the present invention is crushed for use, however, this needs to be a material which has been coarsely crushed.

Therefore, although in many cases, the particle size distribution will range from 0.1 mm or larger to fist sized lumps or cullets, a particle distribution where 0.1 to 50 mm particles are 90% or more of the distribution is preferable.

The reason why coarsely crushed treatment material is required according to the present invention lies in that if particle size is 0.1 mm or less, condensation occurs between fine particles, preventing the material from being smoothly melted in the molten slag although this depends upon how it is added to the molten slag. Furthermore, non-melted lumps will sometimes be generated, or a dust phenomenon will occur at the time of addition in the furnace.

On the other hand, although large coarsely crushed treatment material is preferable, in view of uniformly improved properties of slag arising from the stirrings effect caused by the addition thereof to molten slag, if the lumps or cullets exceed fist size then unmelted portions will be generated, a situation that needs to be avoided.

Therefore, a supplement can be, if necessary, mixed with the above-described slag treatment material in order to improve the effects for quickly melting, diffusing and mixing with the molten slag after the slag treatment material has been added.

Such a supplement may be a powder in which dehydrating and/or decarbonizing reactions are generated by applying heat. Powders of the type described above can be exemplified by one or more of materials selected from: aluminosilicates such as clay, activated clay, diatomaceous earth; other aluminosilicates such as bentonite, perlite and zeolite; carbonates or bicarbonates such as limestone, sodium, potassium, calcium, magnesium or barium carbonate; or borates such as borax, kernite, ulexite or colemanite.

Although the mount of addition of the above-described supplement differs according to type, method of adding the slag powdering prevention agent properties and state of the molten slag, it may be up to 30 wt % with respect to the slag powdering prevention agent, and is preferably in the range of from 5 to 15 wt %.

The particle size of this supplement is preferably smaller than that of the slag powdering prevention agent and its mean particle size is preferably smaller than the lower limit of the slag powdering prevention agent.

The slag treatment material according to the present invention can be prepared by mixing a starting material which contains a boron component as the effective component, and heating the thus-mixed material so as to sinter or melt it, followed by cooling and crushing.

The boron type starting material can be exemplified by artificial materials such as boric acid, sodium borate, natural materials such as borax colemanite ($Ca_2B_6O_{11}.5H_2O$), ulexite ($NaCaB_5O_5O_9.8H_2O$), tincal ($Na_2B_4O_7.10H_2O$), and kernite ($Na_2B_4O_7.4H_2O$). The alkaline material can be exemplified by caustic alkali, alkali carbonate and alkali bicarbonate and so on. The alkali earth metallic material can be exemplified by carbonate, hydroxide, and oxides of alkaline earth metal. The silicon material can be exemplified by silica sand quartz sand, diatom, synthetic silica, slag, clay and the like. Other materials can be exemplified by $Fe_2O_3$, $Al_2O_3$, $MnO_2$, $P_2O_5$, fluoride, or materials containing these materials.

The above-described starting materials are properly selected, mixed to achieve the above-described ratio, and supplied to a required fusing furnace or a calcining furnace so as to be heated/fused or calcined. Next, the thus heat-treated material is subjected to particle size adjustment after it has been cooled down whereby a desired product can be obtained.

Although there is no reason for limiting the heating conditions, temperatures must be those at which water of crystallization or adhered water can be, of course, substantially dehydrated, at which the particles of the material can be calcined with each other, and at which they can be fused. Since this temperature differs in accordance with the composition of the material, it may be determined so as to correspond to the specific heat treatment apparatus.

When vitrification is conducted, the most practical and therefore preferable, method of cooling down the fused liquid is tapping the fused liquid while applying pressured water to granulate the slag, and recovering it as sand-like glass. Another method is one in which the fused liquid to be tapped is placed on a belt conveyer and cooled by water or air to be recovered as cullets.

Next, particle size is adjusted after conducting drying so as to remove adhered water. However, in the case of water-granulated material, particle size adjustment by crushing and screening is not necessarily required since dried material per se can be made into product. Therefore, the particle size adjustment need only be conducted if necessary. Sintered material is subjected to particle size adjustment with a conventional crusher.

In this case, the above-described supplement can be mixed in if desired.

Slags to which the present invention is directed ar slags mainly containing basic type calcium silicates that tend to disintegrate or powder when being cooled or subjected to aging, or types that tend to generate yellowish turbid water when brought into contact with water. Such slags generally have a basicity (weight ratio $CaO/SiO_2$) of at least 1.3, preferably within the range between 1.5 and 3.5 and can be exemplified by blast furnace slag, steel slag for such as stainless steel, or converter slag etc.

Although the amount of slag treatment material to be added with respect to the amount of slag differs in accordance with its composition and properties and the composition etc. of the slag it must be at least about 0.15 wt % as $B_2O_3$ for the purpose of either preventing slag powdering or preventing generation of yellowish turbid water, and be preferably 0.3 wt % or more in consideration of durability of modified slag.

The reason for this lies in that, if it is less than about 0.15 wt %, it is not sufficient to prevent generation of yellowish turbid water and occurrence of powdering. On the other hand, there is no reason to define an upper limit. In many oases, it is naturally limited from the viewpoint of economy or affect on molten metal. Therefore, the preferable range from the viewpoint of practical use is from 0.3 wt % to 1.5 wt %.

Slag can be improved by using the slag treatment material according to the present invention without any particular change in the operating conditions of conventional blast furnaces and steel furnaces, and the slag treatment material can be added to molten slag in the presence or non-presence of molten metal it can be understood that this will be very advantageous.

Therefore, when molten iron is delivered from a blast furnace together with a slag through gutters the slag treatment material may be added into a slag accumulated on iron by a dam disposed in the gutter through supplying port being disposed at the desired position on the gutter. Alternatively, it may be added at the time of delivery together with molten slag.

In the case of manufacturing stainless steel or the like, the slag treatment material is added, similar to the above description, during the time the stainless steel is delivered from an electric fusing furnace to a ladle o during time the molten slag is tapped into a slag pot from the ladle.

In this case, the manner of adding the slag treatment material to molten slag is not particularly limited and need only satisfy the necessity that the slag treatment material should be quickly melted and diffused into the molten slag.

For example, a method in which the slag treatment material is added as it is to molten slag in the presence or non presence of molten metal, is a method in which the same is added under air pressure, a method in which it is supplied as bagged or a method in which molten slag is supplied to a place where the slag treatment material has been previously supplied can be employed.

If the slag treatment material is added in the presence of molten metal, the degree of affect on the mixture of boron into the molten metal, etc. can be substantially neglected. This makes application of the slag treatment material according to the present invention particularly advantageous.

Therefore, the slag treatment material is added only into a slag tapped in a slag pot when the above-described affect of boron is expected, but in other cases, it is practical to add it to the slag in the presence of molten metal which has been maintained at high temperature since the viscosity of the molten slag is relatively small, allowing the melting and diffusion of the slag treatment material to be conducted quickly, as a result of which, the improvement in properties of the slag can be uniformly conducted.

If there is a fear of the slag treatment material insufficiently melting or diffusing due to an increase in the viscosity of the molten slag when it is added to a slag pot, re-heating of the slag or addition of the above-described supplement is, if necessary, required for the purpose of assisting diffusion of the slag treatment material.

Therefore, it is substantially unnecessary to provide any special diffusion means for rapidly melting or diffusion of the slag treatment material after it has been added to the molten slag.

As a result, slag whose properties have been improved can be obtained by gradual or rapid cooling in a normal way after the above-described addition has been conducted.

Embodiments

The present invention will now be described with reference to the following embodiments.

EXAMPLE 1

(1) Preparation of slag treatment material sample

The material mixture whose composition (by weight) is as follows (Table 1) was melted in an electric furnace, the thus-obtained molten glass was rappidly charged into water, and the thus-obtained glass material was coarsely crushed. The coarsely crushed glass showed a particle size distribution without exception where particle sizes of 5 to 30 mm were 90% or more of the product.

TABLE 1

| Sample No. | Colemanite | Borax | Boric acid | $K_2CO_3$ | $Li_2CO_3$ | $Mg(OH)_2$ | $BaCO_3$ | Quartz sand | Alumina |
|---|---|---|---|---|---|---|---|---|---|
| 1 | | 100 | 72.3 | | | | | | |
| 2 | | | 100 | 49.7 | | | | | |
| 3 | | | 100 | | 26.4 | | | | |
| 4 | 100 | | 79.3 | | | 84 | | | |
| 5 | | | 100 | | | | 94.3 | | |
| 6 | | | 100 | | | | | | |
| 7 | | | 100 | | | | | 12.6 | |
| 8 | | | 100 | | | | | 9.8 | |

TABLE 1-continued

| Sample No. | Colemanite | Borax | Boric acid | $K_2CO_3$ | $Li_2CO_3$ | $Mg(OH)_2$ | $BaCO_3$ | Quartz sand | Alumina |
|---|---|---|---|---|---|---|---|---|---|
| 9 | | 100 | | | | | | 7 | |
| 10 | | | 100 | 88 | | | | 41 | |
| 11 | | | 100 | | 71 | | | 160 | |
| 12 | 100 | | 4.2 | | | | | 4.4 | |
| 13 | | | 100 | | | 92 | | 19 | |
| 14 | | | 100 | | | | 64 | 17 | |
| 15 | 100 | | 13.3 | | | | | 62.6 | 16.8 |
| 16 | | | 100 | 32.6 | | 80.4 | | 34.0 | 11.2 |
| 17 | | | 100 | | | | 43 | 79.4 | 11.2 |

Note: Boric acid used was an anhydride. Potassium carbonate, lithium carbonate, magnesium hydroxide, barium carbonate and alumina used were industrial chemical grade. Colemanite was constituted by 45%-$B_2O_3$, 25%-CAO, 4%-$SIO_2$, 24%-Ignition loss and 2%-balance. Borax was constituted by 21.43%- $Na_2O$, 48.21%-$B_2O_3$ and 29.96%-Ignition loss, both the colemanite and borax being made in Turkey. Quartz sand used was dried 98%-pure $SiO_2$ from Africa.

The major compositions of samples Nos. 1 to 8 are shown in the following table 2.

TABLE 2

| Sample No. | Glass composition |
|---|---|
| 1 | $Na_2O.5B_2O_3$ |
| 2 | $K_2O.4B_2O_3$ |
| 3 | $Li_2O.4B_2O_3$ |
| 4 | $CaO.4B_2O_3$ |
| 5 | $MgO.B_2O_3$ |
| 6 | $BaO.3B_2O_3$ |
| 7 | $SiO_2.7B_2O_3$ |
| 8 | $SiO_2.9B_2O_3$ |

The outline of the chemical compositions (weight %) of samples Nos. 9 to 17 obtained similarly are as follows:

TABLE 3

| Sample No. | Chemical analysis of Glass Samples Nos. 9 to 17 (weight %) | | | | | | | | | |
|---|---|---|---|---|---|---|---|---|---|---|
| | $B_2O_3$ | $Na_2O$ | $K_2O$ | $Li_2O$ | CaO | MgO | BaO | $SiO_2$ | $Al_2O_3$ | Residue |
| 9 | 63 | 28 | | | | | | 9 | | |
| 10 | 50 | | 30 | | | | | 20 | | |
| 11 | 35 | | | 10 | | | | 55 | | |
| 12 | 59 | | | | 29 | | | 10 | | 2 |
| 13 | 55 | | | | | 35 | | 10 | | |
| 14 | 60 | | | | | | 30 | 10 | | |
| 15 | 35 | | | | 15 | | | 39 | 10 | 1 |
| 16 | 45 | | 10 | | | 25 | | 15 | 5 | |
| 17 | 45 | | | | | | 15 | 35 | 5 | |

② Slag modification test

When slag having basicity ($CaO/SiO_2=2.10$) which is the first molten slag tapped from an electric furnace for manufacturing stainless steel (capacity: 30 tons) was removed i.e., tapped from a ladle to a slag pot, 30 Kg of each of the above slag treatment material test samples were simultaneously supplied in 10 Kg vinyl bags. Next, after the thus-supplied slag was solidified by allowing it to stand at low temperature, the state of the slags were observed until the temperature reached room temperature.

The test conditions are as follows:

TABLE 4

| Test No. | Sample No. | Amount of tapping (t) | Amount of sample added (kg/t slag) | $B_2O_3$ contained in slag (wt %) | Temperature at tapping (°C.) |
|---|---|---|---|---|---|
| 1 | 1 | 4.99 | 6.01 | 0.51 | 1443 |
| 2 | 2 | 4.77 | 6.29 | 0.47 | 1421 |
| 3 | 3 | 5.76 | 5.20 | 0.47 | 1420 |
| 4 | 4 | 5.00 | 6.00 | 0.50 | 1407 |
| 5 | 5 | 3.65 | 8.21 | 0.52 | 1432 |
| 6 | 6 | 3.68 | 8.16 | 0.47 | 1422 |
| 7 | 7 | 5.56 | 5.39 | 0.48 | 1442 |
| 8 | 8 | 5.48 | 5.48 | 0.50 | 1449 |
| 9 | 9 | 3.71 | 8.10 | 0.51 | 1432 |
| 10 | 10 | 3.26 | 9.20 | 0.46 | 1411 |
| 11 | 11 | 2.23 | 13.43 | 0.47 | 1418 |
| 12 | 12 | 3.38 | 8.87 | 0.52 | 1444 |
| 13 | 13 | 3.37 | 8.91 | 0.49 | 1406 |
| 14 | 14 | 3.46 | 8.67 | 0.52 | 1428 |
| 15 | 15 | 2.21 | 13.58 | 0.47 | 1430 |
| 16 | 16 | 2.81 | 10.67 | 0.48 | 1430 |
| 17 | 17 | 2.65 | 11.33 | 0.51 | 1441 |
| 18 | — | 4.12 | 0 | 0 | 1431 |
| 19 | — | 4.07 | 0 | 0 | 1406 |
| 20 | — | 3.99 | 0 | 0 | 1413 |

After addition of each slag treatment test sample, no dust or gases were generated in any test, such that such addition of slag treatment test sample could be conducted safely. When molten slag was supplied i.e., tapped to the slag pot, excellent diffusion and mixing of the slag treatment test samples were observed.

After allowing each test amount of slag to stand at room temperature for cooling after addition of slag treatment test samples, the state of the slags were observed. Test Nos. 1 to 17 showed no powdering or degradation.

On the other hand, conventional slags of test nos. 18–20 to which no slag treatment materials were added decayed and powdered after being cooled.

The outline of the analyzed value (weight %) of slag used in the test is as follows:

| Test No. | CaO | $SiO_2$ | MgO | $Al_2O_3$ |
|---|---|---|---|---|
| 1 to 20 | 48 to 55 | 22 to 28 | 9 to 13 | 9 to 15 |

In none of the tests, was dust generation observed due to supply of the test samples, and the test samples instantaneously splashed and flowed on the molten slag. The state of the slags were observed after each slag had been allowed to stand and cool to room temperature. No decay or powdering phenomenon were observed it was found that an excellent effect can be obtained by using 0.46 to 0.53 wt % of $B_2O_3$.

EXAMPLE 2

(1) Preparation of slag treatment material sample

A fused liquid having the same glass composition as those used as samples Nos. 1, 2 and 4 according to Example 1 was granulated with pressured water, and the resultant crushed glass product was dried. Then the slag treatment materials shown in Table 5 were prepared.

TABLE 5

| Slag treatment material | Glass composition | Particle size |
|---|---|---|
| 18 | $Na_2O.5B_2O_3$ | In all of the samples, |
| 19 | $Li_2O.4B_2O_3$ | particles sized from 0.1 |
| 20 | $K_2O.4B_2O_3$ | to 5 mm shared 90% |

(2) Slag modification test

When slag having basicity ($CaO/SiO_2=2.02$) which is the first molten slag tapped from an electric furnace for manufacturing stainless steel (capacity: 30 tons) was removed from a ladle to a slag pot, 30 Kg of each of the above slag treatment material test samples were simultaneously supplied in 10 Kg vinyl bags. Next, after the thus-supplied slag was solidified by allowing it to stand at low temperature, the state of the slags were observed until the temperature reached room temperature.

The test conditions are as follows:

TABLE 6

| Test No. | Sample No. | Amount of tapping (t) | Amount of sample added (kg/t slag) | $B_2O_3$ contained in slag (wt %) | Temperature at tapping (°C.) |
|---|---|---|---|---|---|
| 21 | 18 | 5.20 | 16.3 | 0.49 | 1436 |
| 22 | 19 | 5.53 | 16.3 | 0.49 | 1404 |
| 23 | 20 | 4.39 | 17.0 | 0.51 | 1419 |
| 24 | — | 5.49 | — | — | 1420 |

After addition of each test sample, no dust or gases were generated in any test, and addition work could be conducted safely. When molten slag was supplied to the slag pot, excellent diffusion and mixing were observed.

After allowing each slag to stand at room temperature for cooling after being tested, the state of the slags were observed. Test Nos. 21 to 23 did not show any decay or powdering.

After allowing these slag lumps to stand outdoors for three months, no change was observed.

On the other hand, the conventional slag of test No. 24 to which no slag treatment material was added decayed and powdered when it was cooled.

Comparative Example

In Example 2, borax ($Na_2B_4O_7.10H_2$)($B_2O_3$:37.00 wt %, $Na_2O$:16.5 wt %)(particles sized from 0.2 to 0.4. mm comprising 55%) of 12 kg/ton slag was supplied in separate vinyl bags. Intense splash and blow resulted and un-dissolved lumps were generated, causing the supply to be stopped.

EXAMPLE 3

(1) Preparation of slag treatment material sample

A fused liquid having the same composition as those used in the test samples 4, 5 and 6 according to Example 1 was granulated with pressured water, and the resultant crushed vitrified product was dried. Then, the slag treatment materials shown in Table 7 were prepared.

TABLE 7

| Sample No. | Glass composition | Particle size |
|---|---|---|
| 21 | $MgO.B_2O_3$ | In all of the samples, particles |
| 22 | $CaO.4B_2O_3$ | sized from 0.1 to 5 mm shared |
| 23 | $BaO.3B_2O_3$ | 90% |

(2) Slag modification test

When slag having basicity ($CaO/SiO_2=2.06$) which is the first molten slag tapped from an electric furnace for manufacturing stainless steel (capacity: 30 tons) was removed from a ladle to a slag pot, 40 Kg of each of the above slag treatment material test samples were simultaneously supplied in 10 Kg vinyl bags. Next, after the thus-supplied slag was solidified by allowing it to stand at low temperature, the state of the slags were observed until the temperature reached room temperature.

The test conditions are as follows:

TABLE 8

| Test No. | Sample No. | Amount of tapping (t) | Amount of sample added (kg/t slag) | $B_2O_3$ contained in slag (wt %) | Temperature at tapping (°C.) |
|---|---|---|---|---|---|
| 25 | 21 | 5.28 | 7.58 | 0.48 | 1421 |
| 26 | 22 | 6.80 | 5.88 | 0.49 | 1441 |
| 27 | 23 | 4.91 | 8.15 | 0.47 | 1418 |
| 28 | — | 5.54 | 0 | 0 | 1427 |

After addition of each test sample, no dust or gases were generated in any test, and additional work could be conducted safely. When molten slag was supplied to the slag pot, excellent diffusion and mixing were observed.

After allowing each slag to stand at room temperature for cooling after being tested, the state of the slags were observed. Test Nos. 25 to 27 did not show any decay or powdering.

After allowing these slag lumps to stand outdoors for three months, no change was observed.

On the other hand, the conventional slag of test No. 28 to which no slag treatment material was added decayed and powdered when it was cooled.

EXAMPLE 4

(1) Preparation to slag treatment material sample

A fused liquid having the same composition as those used in the test samples 7 and 8 according to the Example 1 was granulated with pressured water, and the resultant crushed glass product was dried. Then, the slag treatment materials shown in Table 9 were prepared.

TABLE 9

| Sample No. | Glass composition | Particle size |
|---|---|---|
| 24 | $SiO_2.7B_2O_3$ | In all of the samples, particles |
| 25 | $SiO_2.9B_2O_3$ | sized from 0.1 mm to 5 mm shared 90% |

(2) Slag modification test

When slag having basicity ($CaO/SiO_2=2.13$) which is the first molten slag tapped from an electric furnace for manufacturing stainless steel (capacity: 30 tons) was removed from a ladle to a slag pot, 30 Kg of each of the above slag treatment material test samples were simultaneously supplied in 10 Kg vinyl bags. Next, after the thus-supplied slag was solidified by allowing it to stand at low temperature, the state of the slags were observed until the temperature reached room temperature.

The test conditions are as follows

TABLE 10

| Test No. | Sample No. | Amount of tapping (t) | Amount of sample added (kg/t slag) | $B_2O_3$ contained in slag (wt %) | Temperature at tapping (°C.) |
|---|---|---|---|---|---|
| 29 | 24 | 5.68 | 5.28 | 0.47 | 1415 |
| 30 | 25 | 5.37 | 5.59 | 0.51 | 1445 |
| 31 | — | 5.20 | 0 | 0 | 1432 |

After addition of each test sample, no dust or gases were generated in any test, and additional work could be conducted safely. When molten slag was supplied to the slag pot, excellent diffusion and mixing were observed. After allowing each slag to stand at room temperature for cooling after being tested, the state of the slags were observed. Test Nos. 29 to 30 showed no powdering or degradation.

After allowing these slag lumps to stand outdoor for three months, no change was observed.

On the other hand, the conventional slag of Test No. 31 to which no slag treatment material was added decayed and powdered when it was cooled.

EXAMPLE 5

(1) Preparation of slag treatment material sample

A fused liquid having the same composition as those used in that according to the Example 1 was fused in an electric furnace, granulated with pressured water, and the resultant slag treatment material shown in Table 11 was prepared.

TABLE 11

| Sample No. | Composition (wt %) | | | | |
|---|---|---|---|---|---|
| | $B_2O_3$ | $Li_2O$ | $Na_2O$ | $K_2O$ | $SiO_2$ |
| 26 | 34 | | 15 | | 51 |
| 27 | 63 | | 28 | | 9 |
| 28 | 30 | | | 15 | 55 |
| 29 | 50 | | | 30 | 20 |
| 30 | 35 | 10 | | | 55 |

(2) Slag modification test

When slag having basicity ($CaO/SiO_2=2.15$) which is the first molten slag tapped from an electric furnace for manufacturing stainless steel (capacity: 30 tons) was removed from a ladle to a slag pot, 50 Kg of each of the above slag treatment material test samples were simultaneously supplied in 10 Kg vinyl bags. Next, after the thus-supplied slag was solidified by allowing it to stand at low temperature, the state of the slag were observed until the temperature reached room temperature.

The test conditions are as follows:

TABLE 12

| Test No. | Sample No. | Amount of tapping (t) | Amount of sample added (kg/t slag) | $B_2O_3$ contained in slag (wt %) | Temperature at tapping (°C.) |
|---|---|---|---|---|---|
| 32 | 26 | 3.27 | 15.29 | 0.52 | 1407 |
| 33 | 27 | 6.30 | 7.94 | 0.50 | 1432 |
| 34 | 28 | 3.19 | 15.67 | 0.47 | 1423 |
| 35 | 29 | 4.90 | 10.20 | 0.51 | 1416 |
| 36 | 30 | 3.65 | 13.70 | 0.48 | 1440 |
| 37 | — | 5.22 | 0 | 0 | 1431 |

After addition of each test sample, no dust or gases were generated in any test and additional work could be conducted safely. When molten slag was supplied to the slag pot, excellent diffusion and mixing were observed.

After allowing each slag to stand at room temperature for cooling after being tested, the state of the slags were observed. Test No. 32 to 36 showed no powdering or degradation.

After allowing these slag lumps to stand outdoor for three months, no change was observed.

On the other hand the conventional slag to which no slag treatment material was added decayed and powdered when it was cooled.

EXAMPLE 6

(1) Preparation of slag treatment material sample

A fused liquid having the same composition as that used in Example 1 was fused in an electric furnace, granulated with water, and the resultant slag treatment material shown in Table 13 was prepared.

TABLE 13

| Sample No. | Composition (wt %) | | | | | |
|---|---|---|---|---|---|---|
| | $B_2O_3$ | CaO | MgO | BaO | $SiO_2$ | $Na_2O$ |
| 31 | 59 | 29 | | | 10 | |
| 32 | 40 | 30 | | | 25 | 5 |
| 33 | 55 | | 30 | | 10 | |
| 34 | 30 | | 15 | | 50 | 5 |
| 35 | 60 | | | 30 | 10 | |
| 36 | 25 | | | 20 | 44 | 11 |

(2) Slag modification test

When slag having basicity ($CaO/SiO_2=2.10$) which is the first molten slag tapped from an electric furnace for manufacturing stainless steel (capacity: 30 tons) was removed from a ladle to a slag pot, 40 Kg of each of the above slag treatment material test samples were simultaneously supplied in 10 Kg vinyl bags. Next after the thus-supplied slag was solidified by allowing it to stand at low temperature, state of the slags were observed until the temperature reached room temperature.

The test conditions are a follows:

TABLE 14

| Test No. | Sample No. | Amount of tapping (t) | Amount of sample added (kg/t slag) | $B_2O_3$ contained in slag (wt %) | Temperature at tapping (°C.) |
|---|---|---|---|---|---|
| 38 | 31 | 4.78 | 8.37 | 0.49 | 1415 |
| 39 | 32 | 3.40 | 11.76 | 0.47 | 1442 |
| 40 | 33 | 4.31 | 9.28 | 0.51 | 1430 |
| 41 | 34 | 2.61 | 15.33 | 0.46 | 1431 |
| 42 | 35 | 4.90 | 8.16 | 0.49 | 1439 |
| 43 | 36 | 2.22 | 18.02 | 0.45 | 1420 |

TABLE 14-continued

| Test No. | Sample No. | Amount of tapping (t) | Amount of sample added (kg/t slag) | $B_2O_3$ contained in slag (wt %) | Temperature at tapping (°C.) |
|---|---|---|---|---|---|
| 44 | — | 3.38 | 0 | 0 | 1443 |

After addition of each test sample, no dust or gases were generated in any test and additional work could be conducted safely. When molten slag was supplied to the slag pot, excellent diffusion and mixing were observed.

After allowing each slag to stand at room temperature for cooling after being tested, the state of the slags were observed. Test Nos. 38 to 43 showed no powdering or degradation.

After allowing these slag lumps to stand outdoors for three months, no change was observed.

On the other hand, the conventional slag of test No. 44 to which no slag treatment material was added decayed and powdered when it was cooled.

EXAMPLE 7

(1) Preparation of a sample of slag treatment material

A material whose composition (weight) is as shown below was heated and sintered at a predetermined temperature for 20 minutes in an electric furnace. After this sintering had been completed, the material heated was cooled below 100.C and crushed to prepare a slag treatment material in which particles of from 0.1 to 0.5 mm comprised 90% or more of the material.

TABLE 15

| Sample No. | 37 | 38 | 39 | 40 | 41 | 42 | 43 | 44 | 45 | 46 |
|---|---|---|---|---|---|---|---|---|---|---|
| Boric acid anhydride | | | 100 | | | 100 | | 100 | | 100 |
| Borax anhydride | 100 | 100 | | 100 | 100 | | | | 100 | |
| Colemanite(anhydride) | | | | 76 | 76 | | 100 | | | |
| Rare lime | 10.4 | | 56.1 | | | 50 | 13 | 80 | 40 | |
| Magnesium oxide | | 5.1 | | | | | | | | 20 |
| Quartz sand | | | | 30 | | | | | | 30 |
| Kaolin | | | | | 100 | 100 | | | 40 | |
| Sodium fluoride | | | | | | | 39 | | 40 | |
| Fluorite | | | | | | | | 40 | | 30 |
| Calcining Temperature | 700 | 700 | 400 | 700 | 700 | 400 | 650 | 400 | 650 | 500 |

The materials used were crushed as necessary, and the resultant particle sizes were adjusted to pass through a 16-mesh Tyler reference screen and fit in a 100-mesh screen. As a result, the mixed starting materials shown in Table 15 were prepared to be used as the material for the sintering test. The chemical composition (weight %) of each slag treatment material was as follows:

TABLE 16

| | Boric acid | Borax | Colemanite | Quick lime | Magnesium oxide | Quartz sand | Kaolin | Sodium fluoride | Fluorite |
|---|---|---|---|---|---|---|---|---|---|
| $B_2O_3$ | 99.8 | 69.2 | 60.8 | | | | | | |
| $Na_2O$ | | 30.8 | | | | | | 73.8 | |
| CaO | | | 33.8 | 96 | | | | | 57 |
| MgO | | | | | 98 | | | | |
| $Al_2O_3$ | | | | | | | 44.2 | | 0.5 |
| $SiO_2$ | | | 5.4 | | | 98 | 54.8 | | 12 |
| F | | | | | | | | 45.6 | 36 |
| Residue | | | 2.7 | 2 | | | | | 6.7 |
| Ig loss | | | | 2 | 2 | 2 | 1 | | 3 |

Colemanite was made a test sample after it had been completely dehydrated at 600° C.

The compositions of the thus-obtained slag treatment materials were as shown in Table 17, they being strong sintered material.

TABLE 17

| Sample No. | Composition (wt %) | | | | | | | |
|---|---|---|---|---|---|---|---|---|
| | $B_2O_3$ | $Na_2O$ | CaO | MgO | $Al_2O_3$ | $SiO_2$ | F | Residue |
| 37 | 63 | 28 | 9 | | | | | |
| 38 | 66 | 29 | | 5 | | | | |
| 39 | 65 | | 35 | | | | | |
| 40 | 56.1 | 15.1 | 12.3 | | | 16.4 | | |
| 41 | 42.5 | 11.4 | 9.3 | | 16.7 | 20.0 | | |
| 42 | 40.5 | | 19.4 | | 18.2 | 21.9 | | |
| 43 | 37.7 | 18.6 | 29.0 | | | 3.35 | 11.1 | |
| 44 | 45.6 | | 45.5 | | | | 14.4 | 5 |
| 45 | 30.5 | 26.6 | 17.3 | | 8.0 | 9.5 | 8.0 | |
| 46 | 55.6 | | 9.5 | 10.9 | | 16.4 | 7.6 | |

(2) Slag modification test

When slag having basicity ($CaO/SiO_2=2.11$) which is the first molten slag tapped from an electric furnace for manufacturing stainless steel (capacity: 30 tons) was removed from a ladle to a slag pot, 40 Kg of each of the above slag treatment material test samples were simultaneously supplied in 5 Kg vinyl bags. Next, after the thus-supplied slag was solidified by allowing it to stand at low temperature, the state of the slags were observed until the temperature reached room temperature.

The test conditions are as follows:

TABLE 18

| Test No. | Sample No. | Amount of tapping (t) | Amount of sample added (kg/t slag) | $B_2O_3$ contained in slag (wt %) | Temperature at tapping (°C.) |
|---|---|---|---|---|---|
| 45 | 37 | 4.85 | 8.25 | 0.52 | 1412 |
| 46 | 38 | 5.39 | 7.42 | 0.49 | 1437 |
| 47 | 39 | 5.20 | 7.69 | 0.50 | 1429 |
| 48 | 40 | 4.88 | 8.20 | 0.46 | 1442 |
| 49 | 41 | 3.62 | 11.06 | 0.47 | 1437 |
| 50 | 42 | 3.18 | 12.59 | 0.51 | 1441 |
| 51 | 43 | 3.02 | 13.26 | 0.50 | 1423 |
| 52 | 44 | 4.15 | 9.65 | 0.44 | 1416 |
| 53 | 45 | 2.65 | 15.08 | 0.46 | 1429 |

TABLE 18-continued

| Test No. | Sample No. | Amount of tapping (t) | Amount of sample added (kg/t slag) | $B_2O_3$ contained in slag (wt %) | Temperature at tapping (°C.) |
|---|---|---|---|---|---|
| 54 | 46 | 4.54 | 8.81 | 0.49 | 1428 |
| 55 | — | — | — | — | 1435 |

After addition of each test sample, no dust or gases were generated in any test, and additional work could be conducted safely. When molten slag was supplied to the slag pot, excellent diffusion and mixing were observed.

After allowing each slag to stand at room temperature for cooling after being tested, the state of the slags were observed. Test Nos. 45 to 54 showed no powdering or degradation.

After allowing these slag lumps to stand outdoor for three months, no change was observed.

On the other hand the conventional slag of test No. 55 to which no slag treatment material was added decayed and powdered when it was cooled.

Analyzed values of the slag for test (weight %) were as follows:

| Test No. | CaO | $SiO_2$ | MgO | $Al_2O_3$ |
|---|---|---|---|---|
| 45 to 55 | 49 to 56 | 22 to 26 | 10 to 13 | 11 to 12 |

EXAMPLE 8

A predetermined amount of slag treatment sample 9 identical to that used in Example 1 was added as packed in plastics film bags to fused slag occurring during tapping from an electric furnace when the slag was being removed from a ladle to a slag pot. After treatment, The slag was made into ballast by adjusting its particle size to a range equivalent to MS-25 after normal cooling by standing.

The presence of yellowish turbid water from the ballast was measured in accordance with the following evaluation method. The results of measurement and the chemical composition (weight %) are shown in Table 19.

TABLE 19

| Test No. | 56 | 57 | 58 | 59 | 60 |
|---|---|---|---|---|---|
| Amount of slag (t/ch) | 3.0 | 3.0 | 3.0 | 3.0 | 3.0 |
| Amount of addition (kg/ch) | — | 5 | 10 | 15 | 25 |
| Rate of addition | | | | | |
| wt % | 0 | 0.17 | 0.34 | 0.50 | 0.83 |
| Conversion by $B_2O_3$ | 0 | 0.11 | 0.21 | 0.32 | 0.52 |
| Chemical composition of slag (wt %) | | | | | |
| CaO | 27.1 | 26.5 | 27.1 | 24.3 | 25.6 |
| $SiO_2$ | 20.6 | 20.2 | 20.5 | 21.1 | 20.3 |
| MgO | 15.6 | 11.0 | 16.8 | 15.4 | 19.7 |
| $Al_2O_3$ | 28.5 | 27.3 | 25.7 | 25.4 | 26.1 |
| MnO | 1.2 | 1.2 | 1.1 | 0.8 | 1.3 |
| $TiO_2$ | 0.7 | 0.8 | 0.5 | 0.5 | 0.6 |
| FeO | 2.2 | 0.9 | 2.6 | 1.1 | 2.3 |
| S | 1.9 | 2.2 | 2.3 | 2.6 | 2.0 |
| P | 0.005 | 0.005 | 0.005 | 0.005 | 0.005 |
| Color Identification Test (yellow index) | 5.0 | 0.5 | 0 | 0 | 0 |
| Remarks | Cont. | Comp. | E | E | E |

(Cont: Contrast example, Comp: Comparison example, E: Example)

Method of evaluating yellowish turbid water

The thus-obtained 500 g of sample ballast was weighed, placed in 1500 ml of pure water, and boiled for 45 minutes in accordance with a color identification test per JIS A5015. The filtered eluate was put in a color comparing tube so as to be visually tested with reference to a potassium bichromate color reference liquid upon the presence of color. In order to numerize the degree of darkness or lightness of the color of the eluate, that is the degree of the hue of the eluate, the absorbance of the reference liquid and the eluate were measured with a spectraphotometer. The results were evaluated with the thus obtained yellow index as shown in Table 20.

TABLE 20

| Hue | Yellow Index | Absorbance (−log T) | Concentration of potassium bichromate reference (g/l) |
|---|---|---|---|
| colorless | 0 | 0.022 or less | 0.002 or less |
| almost colorless | 0.5 | 0.022 to 0.064 | 0.002 to 0.006 |
| extremely light yellow | 1.0 | 0.064 to 0.113 | 0.006 to 0.011 |
| very light yellow | 1.5 | 0.113 to 0.181 | 0.011 to 0.018 |
| slightly light yellow | 2.0 | 0.181 to 0.30 | 0.018 to 0.032 |
| light yellow | 2.5 | 0.30 to 0.46 | 0.032 to 0.052 |
| yellow | 3.0 | 0.46 to 0.80 | 0.052 to 0.10 |
| slightly dark yellow | 3.5 | 0.80 to 1.02 | 0.10 to 0.17 |
| dark yellow | 4.0 | 1.02 to 1.09 | 0.17 to 0.30 |
| very dark yellow | 4.5 | 1.09 to 1.16 | 0.30 to 0.45 |
| brown | 5.0 | 1.16 or more | 0.45 or more |

EXAMPLE 9

Each of slag treatment materials Sample Nos. 1, 3, 12, 15, 18, 25, 26, 27, 28, 29, 30 and 40, each being packed in plastics film bags were added to a fused slag tapped from an electric furnace to comprise 0.40 wt % $B_2O_3$ at the time of being taken out from a ladle to a slag pot. After treatment the respective slags were made into ballast by adjusting particle size to range corresponding to MS-25 after normal cooling by standing.

The ballasts thus-obtained for each treatment material were tested for the generation of yellowish turbid water similar to the above description, with none of them generating yellowish turbid water.

Effect of the Invention (1) Since the slag treatment material according to the present invention comprises coarsely crushed substantially dehydrated heat treated material, especially, vitrified material, it will not generate degassing reactions such as degassing carbon dioxide gas or steam. As a result of this, working environments will not be deteriorated due to blowing or splashing.

(2) For similar reasons, there is substantially endothermic heat arising from the fusion of the material heat of vaporation, heat of transition etc. Therefore, the coarsely crushed vitrified material ca be quickly melted into molten slag.

(3) Diffusion after being melted into molten slag can be optionally adjusted by using a supplement.

(4) The slag treatment material according to the present invention can prevent slag powdering during cooling and substantially prevent generation of yellowish turbid water.

(5) The method according to the present invention is very advantageous from a industrial viewpoint since the slag treatment material can be supplied as it is packed in such as a polyvinyl chloride or polyethylene resin bag, that is so-called polybags without requiring any changes in conventional processes.

What is claimed is:

1. A slag treatment material comprising a material for improving molten slag in such a manner that the resulting fused slag is made resistant against powdering in a cooling process or against generation of yellowish turbid water which is caused when said slag is contacted with rain water, characterized in that: said slag treatment material is formed by coarsely crushing a substantially dehydrated heat treated material containing boron, having a particulate size distribution ranged from 0.1 mm to a first sized mass and melting point below 1,100° C., wherein 90 wt % or more of the particles fall within a range of from 0.1 to 50 mm, and having a melting or softening point ranging from 700° C. to 1050° C., said substantially dehydrated heat treated material being a vitrified material, sintered material or a mixture thereof and consisting essentially of the following components represented by, as oxide form, $B_2O_3$:20 to 50 wt %, $Me_2{}^1O$:3 to 20 wt %, $Me^2O$:10 to 35 wt %, $SiO_2$: 20 to 50 wt % (wherein $Me^1$ represents an alkali metal and $Me^2$ represents alkaline earth metal); and the balance (unavoidable contaminants): 0 to 10 wt %;

and that said material when added to a slag and made into a ballast having a range equivalent to MS-25 and eluated in accordance with JIS A5015, provide a spectorphotometric index of less than about 1.0.

* * * * *